United States Patent [19]
Snell et al.

[11] Patent Number: 5,301,567
[45] Date of Patent: Apr. 12, 1994

[54] LOW PIVOT TILT STEERING COLUMN CLAMPING MECHANISM

[75] Inventors: William M. Snell, Grand Blanc; Thomas S. Kaliszewski, Novi; Rodney L. Eaton, Clarkston, all of Mich.

[73] Assignee: Chrysler Corporation, Highland Park, Mich.

[21] Appl. No.: 948,556

[22] Filed: Sep. 23, 1992

[51] Int. Cl.⁵ .............................................. B62D 1/18
[52] U.S. Cl. ...................................... 74/493; 74/531; 280/775
[58] Field of Search .................. 74/493, 523, 531; 280/775

[56] References Cited

U.S. PATENT DOCUMENTS 3,803,939  4/1974  Schenten .................... 280/775 X
4,541,298  9/1985  Strutt ............................... 74/493
5,088,767  2/1992  Hoblingre et al. ............ 280/775
5,117,707  6/1992  Kinoshita et al. .............. 74/443
5,213,003  5/1993  Speich ............................ 74/493

Primary Examiner—Allan D. Herrmann
Assistant Examiner—David W. Laub
Attorney, Agent, or Firm—Edward A. Craig

[57] ABSTRACT

A device for locking a tilt steering column in adjusted position has two clamping rings, one of which is rotated by a handle. When the handle is rotated in one direction, the clamping rings interact to lock the steering column in adjusted position. When the handle is rotated in the opposite direction, the clamping rings release the steering column so that its position can be adjusted. A third ring is provided to releasably retain the locking rings in locked position.

10 Claims, 5 Drawing Sheets

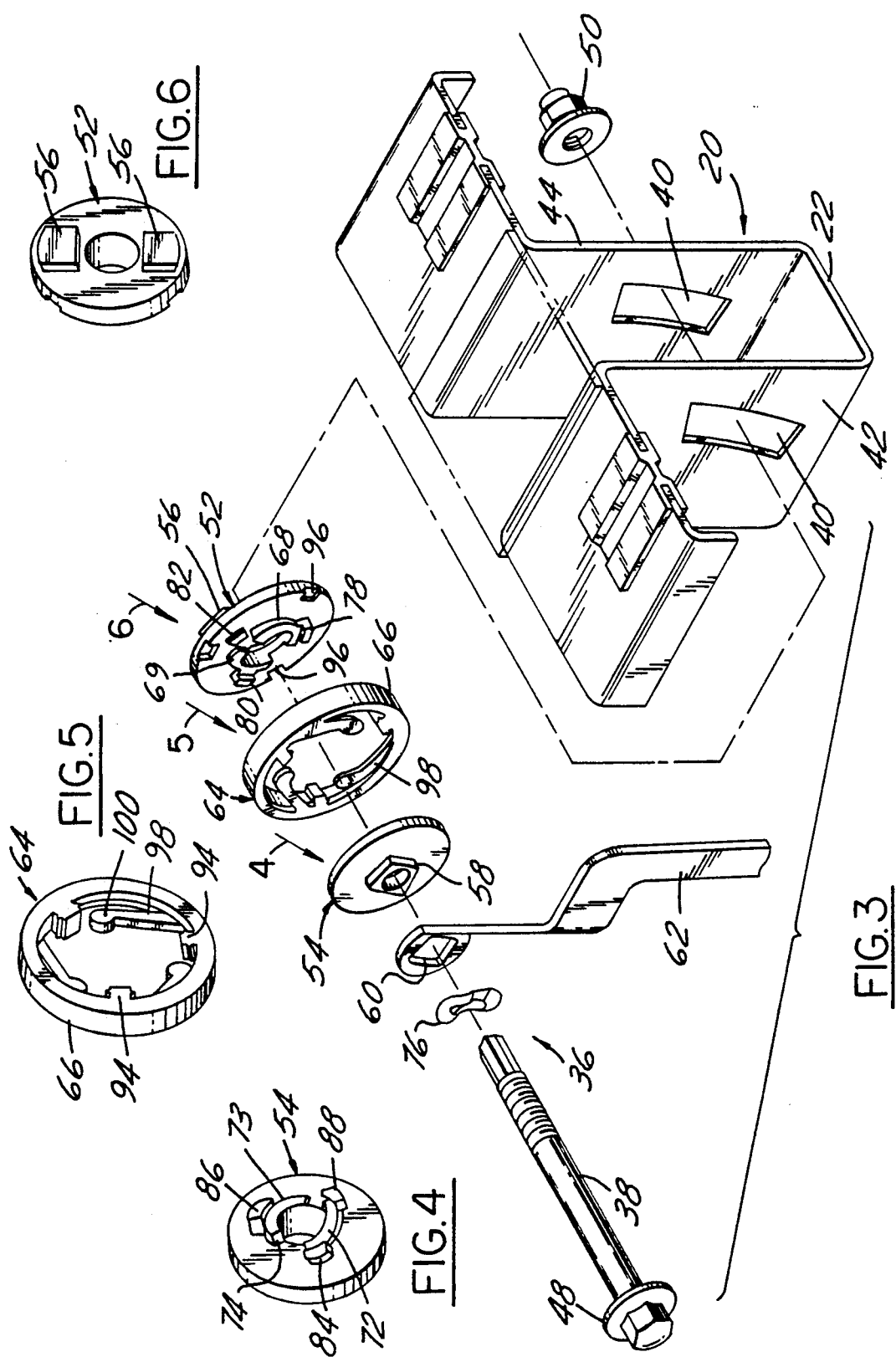

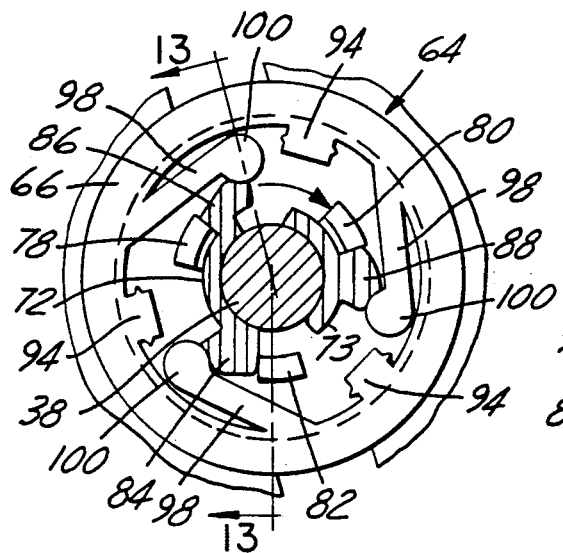
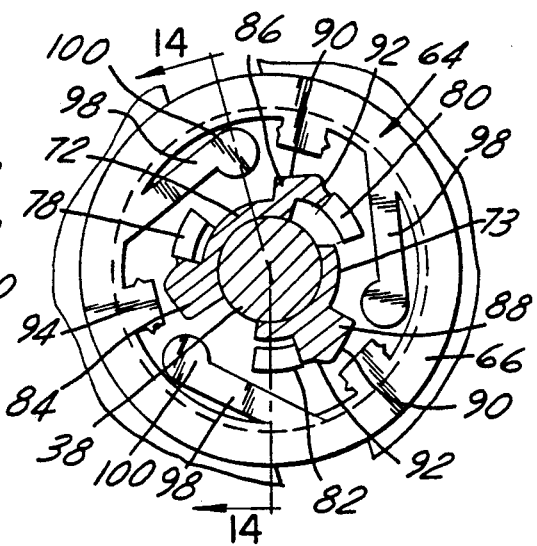
FIG.11    FIG.12
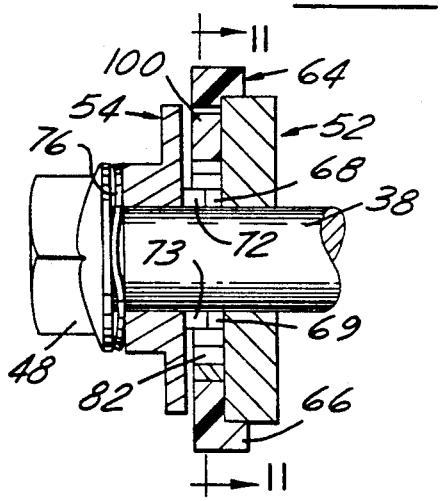
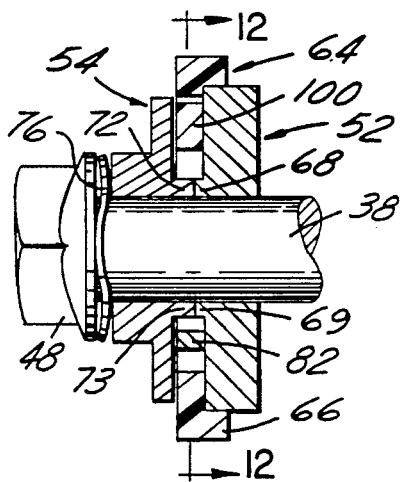
FIG.13    FIG.14
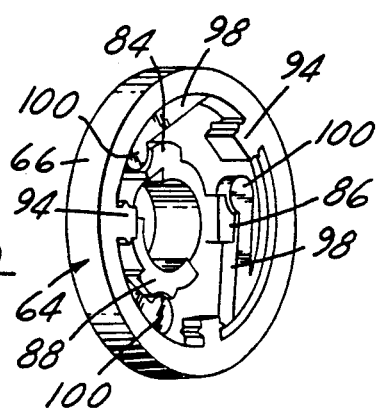
FIG.15
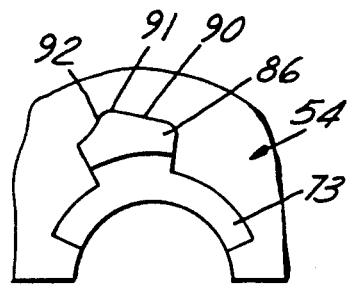
FIG.16

5,301,567

LOW PIVOT TILT STEERING COLUMN CLAMPING MECHANISM

This invention relates generally to tilt steering columns for automotive vehicles and refers more particularly to a device for releasably locking the steering column in adjusted position.

BACKGROUND AND SUMMARY OF THE INVENTION

Various mechanisms have been developed for locking tilt steering columns in adjusted position. Some have detents engageable with notches or teeth to lock the steering column in a number of separate discrete positions. Others have a worm gear/worm wheel arrangement for effecting fine adjustment.

The tilt-lock mechanism of this invention dispenses with detents, gears, worms and the like and provides an improved arrangement for locking the steering column in any desired position.

More specifically, the tilt device of this invention moves with the steering column. The tilt device preferably comprises two clamping rings, one of which can be rotated by a handle. When the handle is rotated in one direction, the clamping rings interact to lock the steering column in adjusted position. When the handle is rotated in the opposite direction, the clamping rings release the column and permit it to be tilted to a different position where it again can be locked by manipulation of the handle.

Preferably the locking rings have interengaging ramps or cams which engage and disengage depending upon the direction in which the handle is rotated.

Preferably also, a third ring is provided for releasably retaining the locking rings in the locked position. This third ring may have a retainer or retainers for engaging a lug or lugs on the rotatable clamping ring with an audible click.

It is an object of this invention to provide a device for releasably locking a steering column in adjusted position having the above features.

It is a further object to provide a releasable locking device for a steering column which is composed of a relatively few simple parts, is capable of being easily manufactured and assembled, is rugged and durable, and is well designed for the accomplishment of its intended function.

Other objects, features and advantages of the invention will become more apparent as the following description proceeds, especially when considered with the accompanying drawings.

BRIEF DESCRIPTION OF THE DRAWINGS

FIG. 3 is an exploded view of the clamping device.

FIG. 4 is a perspective view of one of the clamping rings as viewed in the direction of the arrow 4 in FIG. 3.

FIG. 5 is a perspective view of another ring in the clamping device as viewed in the direction of the arrow 5 in FIG. 3.

FIG. 6 is a view taken in the direction of the arrow 6 in FIG. 3 showing another of the clamping rings.

FIG. 11 is a sectional view taken on the line 11—11 in FIG. 13, showing the clamping device in the clamped position.

FIG. 12 is a sectional view taken on the line 12—12 in FIG. 14, showing the clamping device in the unclamped position.

FIG. 13 is a sectional view taken on the line 13—13 in FIG. 11.

FIG. 14 is a sectional view taken on the line 14—14 in FIG. 12.

FIG. 15 is a perspective view of the retainer ring and one of the two clamping rings.

FIG. 16 is an enlarged fragmentary view of a portion of one of the clamping rings.

DETAILED DESCRIPTION

Figure 1:
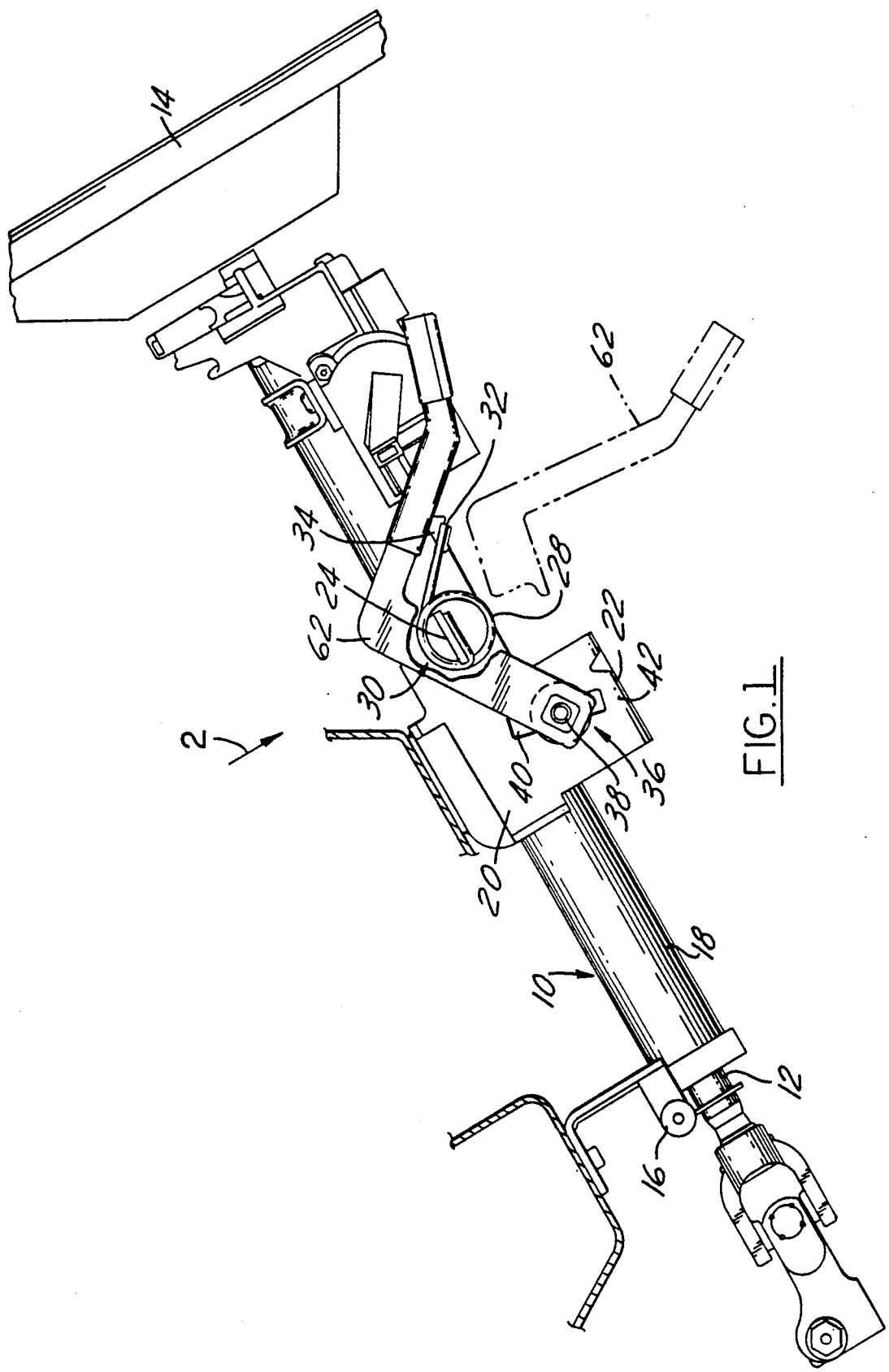
FIG. 1 is a side elevational view of a steering column of an automotive vehicle having a device for releasably clamping the steering column in adjusted position, constructed in accordance with the invention.
Figure 2:
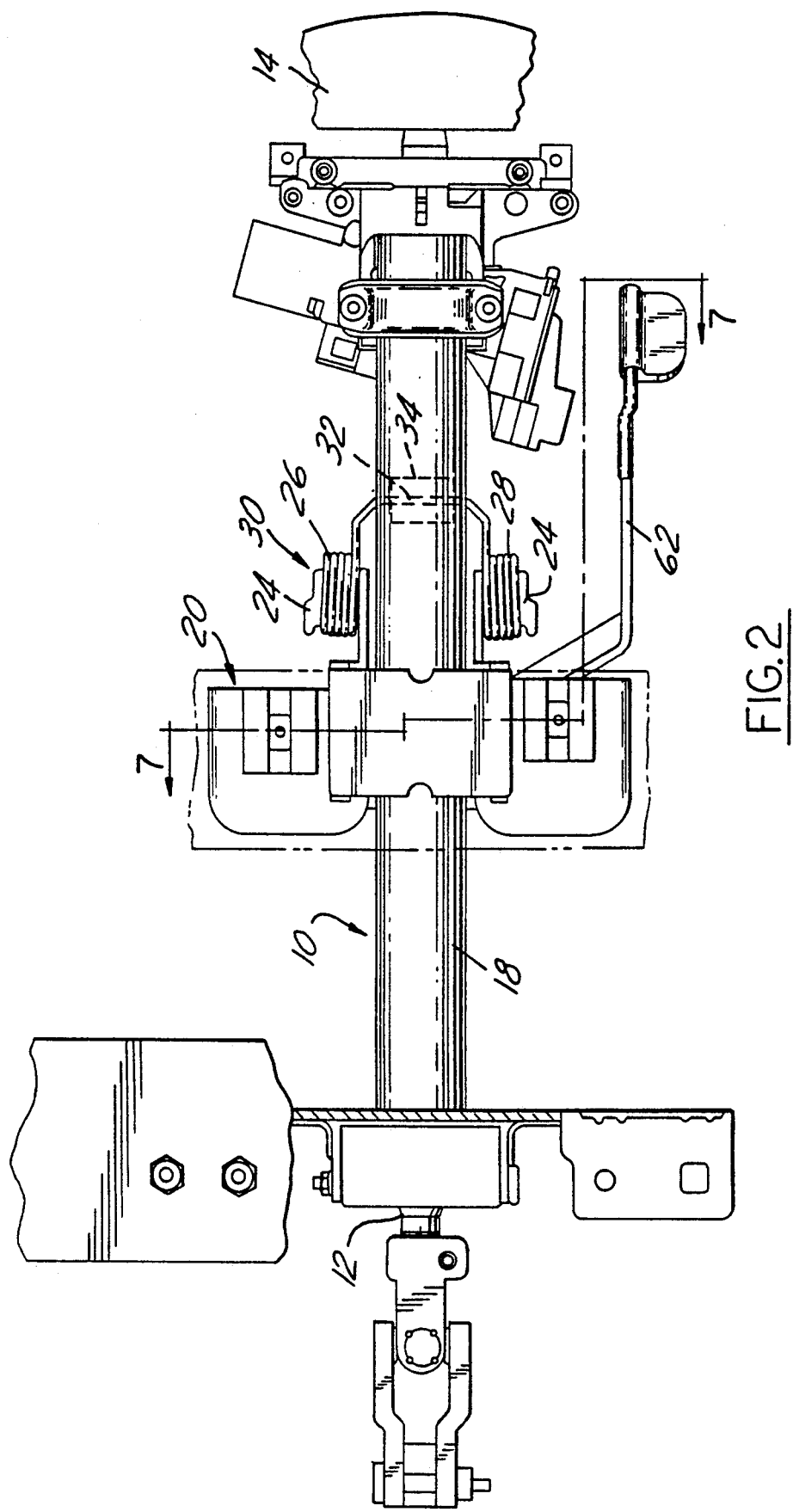
FIG. 2 is a view looking in the direction of the arrow 2 in FIG. 1.
Figure 7:
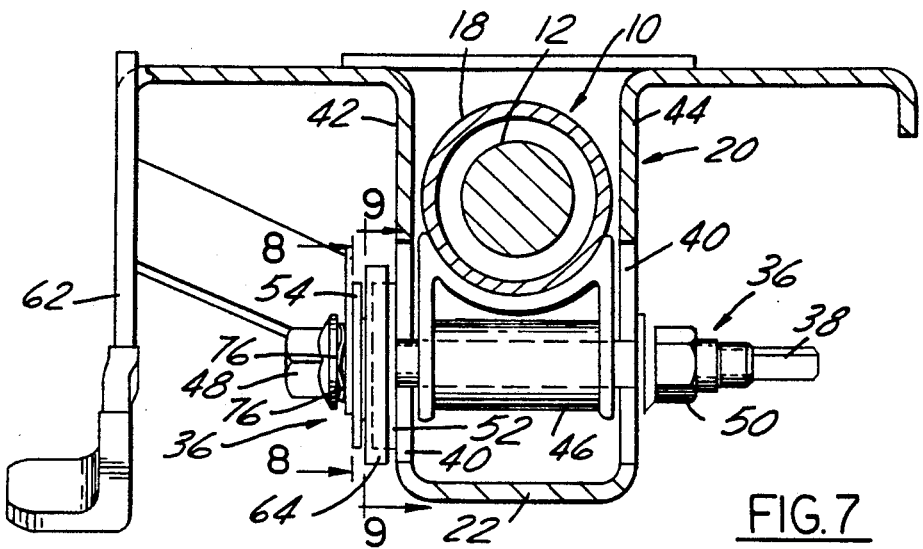
FIG. 7 is a sectional view taken on the line 7—7 in FIG. 2.

Referring now more particularly to the drawings, the steering column 10 comprises a steering shaft 12 on one end of which is secured the steering wheel 14. The other end is connected to the steering mechanism (not shown) and pivots about point 16. The steering shaft is supported for rotation in an elongated tubular housing 18.

The steering column 10 passes through a channel-shaped bracket 20 which is fixed in relation to the vehicle and is capable of pivoting up and down within the channel 22 of the bracket about point 16. The bracket has laterally spaced flanges 24 on which are mounted the coils 26 and 28 of a double torsion spring 30. The coils 26 and 28 are portions of a single continuous length of flexible, resilient spring wire material connected by an integral wire element 32 which extends across the steering column and bears in pressure contact with a spring engagement member 34 carried by the tubular housing. The wire element 32 imposes a constant spring pressure against the steering column 10 urging it in an upward direction in FIG. 1.

The steering column may be locked in adjusted position by a locking device 36. The locking device includes a pin 38 that extends across the channel 22. The pin extends through aligned, elongated arcuate slots 40 in the side walls 42 and 44 of the channel and also through holes in a stamping 46 rigidly secured to the steering column 10 so that the pin moves up and down with the steering column when the steering column is adjusted. The pin has a head 48 on the outer side of channel side wall 42 and a nut 50 threaded on the end on the outer side of side wall 44.

Clamping rings 52 and 54 are sleeved on the pin 38 between head 48 and the outer side of the channel side wall 42. The clamping ring 52 is free to slide longitudinally on the pin, but has lugs 56 on one side which engage in the slot 40 of channel side wall 42 to prevent clamping ring 52 from rotating. The clamping ring 54 is free to rotate and slide longitudinally on the pin 38 and has a non-circular boss 58 on the outer side which fits in a similarly shaped hole 60 in a radially outwardly extending handle 62 so that the ring 54 may be rotated by the handle. The handle 62 and ring 54 may be permanently secured together as by welding if desired. A retainer ring 64 of plastic or like flexible, resilient material encircles the pin between the clamping rings 52 and 54. The clamping rings 52 and 54 are flat discs and the retainer ring 64 is in the form of an open rim 66.

The clamping ring 52 has two angularly spaced, arcuate cams 68 and 69 on the inner side facing clamping ring 54, the axially inner surfaces of which slope away from the disc circumferentially toward the high end 70. The clamping ring 54 has two angularly spaced, arcuate cams 72 and 73 on the inner side facing clamping 52, the axially inner surfaces of which slope away from the disc circumferentially toward the high end 74. The cams on the two clamping rings are concentric and interengage through the space within the rim 66 of the retainer ring 64. A split ring wavy spring 76 encircles the pin 38 between the clamping ring 54 and pin head 48 to press the clamping rings 52 and 54 together.

Clamping ring 52 has angularly spaced stops or lugs 78 and 80 on cams 68 and 69, respectively, and a stop or lug 82 between the adjacent ends of the cams. Lugs 78, 80 and 82 are angularly spaced apart equal distances. Clamping ring 54 has angularly spaced lugs 84 and 86 on the ends of cam 72 and a third lug 88 on cam 73 spaced from lugs 84 and 86. The lugs 78-88 are concentric and lugs 78-82 on clamping ring 52 engage lugs 84-88 on clamping ring 54 to limit the rotation of ring 54 with respect to the non-rotatable ring 52.

The lugs 84, 86 and 88 on clamping ring 54 are identical in shape. The radially outer surfaces have a ramp 90, which is substantially straight and slightly radially outwardly inclined, leading to a peak 91 and finally to a concave recess 92. See FIG. 16

The retainer ring 64 has equally angularly spaced locators 94 which project radially inwardly from the rim 66 and engage in slots 96 in the clamping ring 52 to establish a predetermined angularly relationship between the clamping ring 52 and the retainer ring 64. The retainer ring 64 has equally angularly spaced flexible, resilient arms 98 between the locators 94. The arms lie in the plane of the rim and are integrally connected at one end to the rim and extend non-radially, that is chordwise, within the rim. At their free ends, the arms have cylindrical terminal portions 100, sometimes called retainers, which are angularly spaced apart equal distances. The curvature of retainers 100 matches that of recesses 92 in lugs 84-86. The retainers 100 are adapted to cooperate with the lugs 84, 86 and 88 in releasably retaining the clamping rings 52 and 54 of the locking device 36 clamped together, thereby holding the steering column 10 locked in the desired position.

Figure 8:
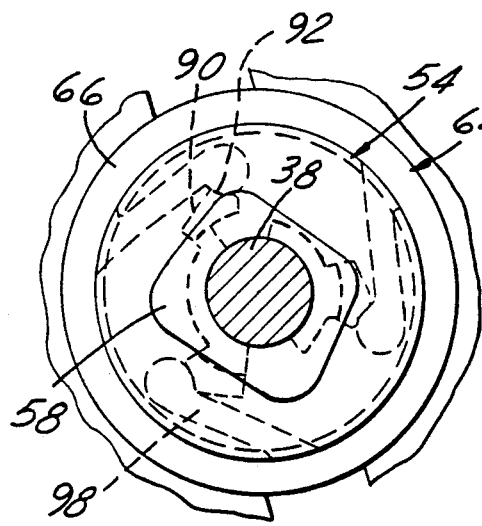
FIG. 8 is a view taken on the line 8—8 in FIG. 7, showing the clamping device in the clamped position.
Figure 9:
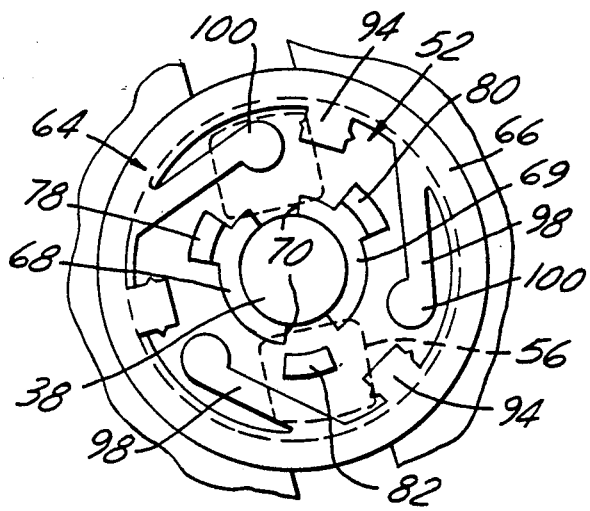
FIG. 9 is a view taken on the line 9—9 in FIG. 7, showing the clamping device in the unclamped position.
Figure 10:
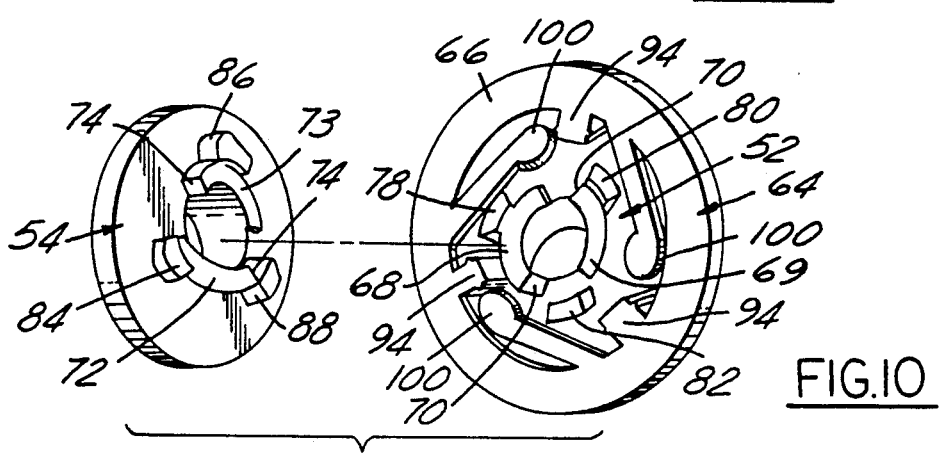
FIG. 10 is an exploded view in perspective showing the retainer ring positioned between the two clamping rings.

The handle 62 is used to manually turn the clamping ring 54 with respect to clamping ring 52 from the unclamped position of FIGS. 9, 12 and 14 to the clamped position of FIGS. 8, 11 and 13. In FIG. 1, the handle is shown in solid in the lock position and in dot-dash lines in the release position. When in the unclamped position determined by engagement of lugs 78, 80 and 82 on the clamping ring 52 with lugs 84, 86 and 88 on clamping ring 54, the cams 68 and 69 on clamping ring 52 are at most only partially engaged with and at least partially circumferentially offset from cams 72 and 73 on clamping ring 54, so that the clamping ring 54 only lightly engages the side wall 42 of channel 22 and the steering column may be shifted up or down to the desired position. When the clamping device is thus released, the steering column is free to pivot about pivot point 16 and is caused to pivot upwardly by the torsion spring 30. When ring 54 is rotated by handle 62 in the direction opposite the arrow in FIG. 11 to the clamped position determined by engagement of the respective lugs 78, 80 and 82 on ring 52 with lugs 86, 88 and 82 on ring 54, the cams 72 and 73 climb cams 68 and 69 to a fully overlapped position pressing clamping ring 54 firmly against the side wall 42 of channel 22 with sufficient force to frictionally lock the pin 38 and, hence, the steering column 10 against movement. During movement of the clamping ring 54 to the clamped position, arms 98 flex and retainers 100 ride up over the ramps 90 on lugs 84, 86 and 88 and drop into recesses 92. The retainers snap into the recesses with an audible click and can be felt by the hand of the operator on handle 62. The retainers 100 when in recesses 92 provide sufficient resistance to prevent relative rotation between the clamping rings 52 and 54 due to vehicle vibration and the like, but this resistance can be overcome by manipulation of the handle when it is desired to unclamp and readjust the steering column.

What is claimed is:

1. A locking device releasably locking a tilt steering column of an automotive vehicle in adjusted position, comprising a bracket adjacent to said column and fixed with respect to the automotive vehicle, a pin connected to a swinging portion of said column and movable along said bracket, a first clamping ring on said pin operably engaging said bracket and held against rotation relative to said bracket, a second clamping ring on said pin rotatable with respect to said first clamping ring, manually operable means for rotating said second ring in one direction to a clamping position and in the opposite direction to a release position, coacting means on said first and second clamping rings operable in response to rotation of said second ring in said one direction to said clamping position to press said first clamping ring against said bracket with sufficient force to frictionally lock said steering column in adjusted position, and means for retaining said second ring in said clamping position with a resistance, the retaining means being able to be overcome by said manually operable means, said retaining means comprising an arm having one end fixed relative to said first clamping ring and having a retainer on the other end thereof, and a lug on said second ring engageable with said retainer upon rotation of said second ring in said one direction to said clamping position to resist reverse rotation of said second ring.

2. A locking device according to claim 1, wherein said coacting means on said first and second clamping rings comprise interengaging camming members.

3. A locking device according to claim 1, wherein said lug engages said retainer with a click which is audible to a person near to the tilting steering column.

4. A locking device according to claim 3, wherein said retaining means comprises a third ring on said pin held against rotation relative to said first ring, said third ring having a plurality of circumferentially spaced, flexible, resilient arms, each with one end only affixed to said third ring and with a retainer on the other end thereof, and lugs on said second ring engageable with said retainers upon rotation of said second ring in said one direction to resist reverse rotation of said second ring.

5. A locking device according to claim 4, wherein said retainers are convexly shaped, said lugs each have a ramp leading to a recessed retainer-receiving portion, and said retainers ride over said ramps upon rotation of said second ring in said one direction and finally lodge in said recessed portions of said lugs.

6. A locking device according to claim 5, wherein said ramps are inclined radially outwardly terminating in a peak adjacent said recessed portions and said recessed portions are concave and shaped to match the convex shape of said retainers.

7. A locking device according to claim 6, wherein said lugs engage in said recessed portions with an audible click and "feel" in said manually operable means.

8. A locking device according to claim 7, wherein said third ring is in the form of a closed circular rim and said arms extend within said rim along non-radial lines.

9. A locking device according to claim 8, and further comprising stops on said first ring engageable with said lugs of said second ring to determine the limit of rotation of said second ring relative to said first ring in said opposite direction to said release portion.

10. A locking device according to claim 9, wherein said coacting means on said first and second clamping rings comprise interengaging camming members.

* * * * *